(12) United States Patent
Pearson et al.

(10) Patent No.: US 7,744,974 B2
(45) Date of Patent: Jun. 29, 2010

(54) COMPOSITE STRUCTURE AND METHOD OF MANUFACTURE

(75) Inventors: Everett A. Pearson, Warren, RI (US); Philip C. Mosher, Jr., Newport, RI (US); Michael Fyrer, Providence, RI (US); Matthew Dunham, Portsmouth, RI (US)

(73) Assignee: Pearson Pilings, LLC, Fall River, MA (US)

( * ) Notice: Subject to any disclaimer, the term of this patent is extended or adjusted under 35 U.S.C. 154(b) by 1264 days.

(21) Appl. No.: 11/184,722

(22) Filed: Jul. 19, 2005

(65) Prior Publication Data

US 2007/0017626 A1    Jan. 25, 2007

(51) Int. Cl.
*B29D 22/00* (2006.01)
*B29D 23/00* (2006.01)
*B32B 1/08* (2006.01)

(52) U.S. Cl. ........................... 428/36.91; 428/36.4
(58) Field of Classification Search ............... 428/34.4, 428/34.5, 35.7, 36.1, 36.2, 36.3, 36.4, 36.91, 428/430, 480
See application file for complete search history.

(56) References Cited

U.S. PATENT DOCUMENTS

| | | |
|---|---|---|
| 3,736,759 A | 6/1973 | Blose |
| 3,957,250 A | 5/1976 | Murphy |
| 4,743,142 A | 5/1988 | Shiraishi et al. |
| 5,087,154 A | 2/1992 | Crawford |
| 5,326,410 A * | 7/1994 | Boyles ..................... 156/71 |
| 5,380,131 A | 1/1995 | Crawford |
| 5,505,030 A | 4/1996 | Michalcewiz et al. |
| 5,721,034 A | 2/1998 | Seemann, III et al. |
| 5,770,276 A | 6/1998 | Greene |
| 5,800,889 A | 9/1998 | Greene |
| 5,904,972 A | 5/1999 | Tunis, III et al. |
| 5,958,325 A | 9/1999 | Seemann, III et al. |
| 5,985,385 A | 11/1999 | Gottfried |
| 6,083,589 A | 7/2000 | Greene |
| 6,123,485 A | 9/2000 | Mirmiran et al. |
| 6,159,414 A | 12/2000 | Tunis, III et al. |
| 6,177,368 B1 * | 1/2001 | Fisher ..................... 442/221 |
| 6,231,967 B1 | 5/2001 | Neukirchen |
| 6,284,336 B1 | 9/2001 | Greene |
| 6,363,681 B1 | 4/2002 | Neuner |
| 6,565,792 B2 | 5/2003 | Hemphill |
| 6,773,655 B1 | 8/2004 | Tunis, III et al. |

* cited by examiner

*Primary Examiner*—Michael C Miggins
(74) *Attorney, Agent, or Firm*—Kriegsman & Kriegsman

(57) ABSTRACT

A fiberglass laminate used in fabricating a composite pile comprising a plurality of fiberglass type layers and an impervious tube array. A tubular composite pile construction includes the laminate as well as plastic inner and outer skins and a resin injected into the laminate. A method of fabrication includes providing a mandrel, wrapping a plastic inner sleeve about a bladder on the mandrel, wrapping the fiberglass laminate and wrapping a plastic outer skin about the laminate. Lastly, a resin is injected into the laminate to substantially fill between the inner and outer skins.

19 Claims, 20 Drawing Sheets

COMPOSITE STRUCTURE AND METHOD OF MANUFACTURE

TECHNICAL FIELD

The present invention relates in general to a composite structure such as is used in fabricating piles or piers. The present invention also relates to a method of manufacturing the composite structure.

BACKGROUND

Pilings or piers that have been fabricated for marine use have most typically been constructed either of wood or of steel pipes. Refer, for example, to U.S. Pat. No. 4,743,142 to Shiraishi et al. One problem associated with wood piles is that they will rot over time even when treated. One of the problems associated with steel pipes is their substantial weight, many times requiring special heavy duty equipment for driving or setting the pipe. Also, steel pipes are subject to corrosion and are not readily cut into smaller length sections.

Lighter weight composite piles or piers have been manufactured previously, however, such piles, pilings or piers have not been fabricated with satisfactory manufacturing techniques and have thus tended to be non-uniform in structure. These piles or piers have also been quite fragile and difficult to manufacture in mass quantities.

OBJECTIVES OF THE INVENTION

Accordingly, it is an object of the present invention to provide a composite pile or pier, preferably constructed of a composite fiberglass material.

Another object of the present invention is to provide an improved composite structure for pilings or the like and which is easily cut into sections and/or readily adapted to be spliced, particularly in the field.

A further object of the present invention is to provide a composite pile that is less likely to fading and cracking, is completely corrosion resistant and impervious to rot, and is completely resistant to insect, borer and marine growth attack.

Still another object of the present invention is to provide a composite pile that is preferably for marine use, but that may be also used for other applications requiring support.

Still a further object of the present invention is to provide an improved composite pile that is light in weight, preferably approximately 1/3 or less the weight of a comparable size steel piling.

Another object of the present invention is to provide an improved composite pile or pier that, once manufactured, does not require any additional coatings or preservatives to maintain the integrity and function of the piling.

A further object of the present invention is to provide an improved composite pile that can be manufactured quickly and efficiently providing a uniform weight and diameter and able to be manufactured in precisely straight lengths.

Still another object of the present invention is to provide a method of manufacturing a composite pile that lends itself to providing the pile in a variety of different lengths and diameters.

Still a further object of the present invention is to provide an improved method of manufacturing a composite pile that enables the manufacturing steps to be carried out in a manner where the piles can be mass produced.

Still another object of the present invention is to provide an improved method of manufacturing a composite pile without requiring a mold.

Still a further object of the present invention is to provide an improved method of manufacturing a composite pile in which the inner and outer layers of the composite form a mold unto themselves.

SUMMARY OF THE INVENTION

To accomplish the foregoing and other objects, features and advantages of the invention, there is provided, in accordance with one aspect of the present invention, a fiberglass laminate used in fabricating a composite pile. This laminate comprises first and second layers of a fiberglass material; a plurality of fiberglass strands extending in a spaced unidirectional matrix and disposed between said respective first and second layers; and a plurality of pervious tube members extending between respective first and second layers and uniformly arranged so as to enable injection of a resin material therethrough.

In accordance with other aspects of the present invention, the first layer may comprise a woven roving fiberglass cloth; the fiberglass cloth has a density of from 12 oz. per square yard to 48 oz. per square yard; the second layer may comprise at least one of a continuous strand fiberglass mat and distributed random fiberglass filaments; the fiberglass strands may comprise continuous fiberglass rovings with a per bundle yield between 53 yards per pound and 625 yard per pound; the strands are grouped, spread and controlled to yield between 30 oz. per square yard and 250 oz. per square yard of unidirectional reinforcement; the tube members may comprise spiral slotted members from which the resin can escape therealong; and the laminate is subjected to passage through a needle loom to form orthogonal fiberglass filaments for binding the layers together.

In accordance with another aspect of the present invention, there is provided a tubular composite pile construction that is comprised of a pre-formed laminate of a plurality of fiberglass layers that are bound together; a plastic inner skin on one side of the laminate and constructed and arranged to form an inner surface of the tubular pile; a plastic outer skin on an opposite side of the laminate and constructed and arranged to form an outer surface of the tubular pile; and a resin injected into said laminate with the skins forming a mold for retaining the resin while also forming the respective inner and outer pile surfaces. Other aspects are that the pervious tube members receive the resin and inject the resin between the first and second layers using vacuum; at least one of the skins is made of PET or other engineered thermoplastics; and the resin is injected with a vacuum.

In accordance with another aspect of the present invention, there is provided a tubular composite pile method which comprises providing a mandrel having a bladder thereabout that can be inflated; wrapping a plastic inner sleeve about the bladder; wrapping a fiberglass laminate, that is comprised of a plurality of fiberglass layers that are at least loosely bound together, about the plastic inner sleeve; wrapping a plastic outer skin about the laminate; and injecting a resin into a laminate to substantially fill between the inner sleeve and outer skin. Other steps may include inflating the bladder prior to injecting the resin; the bladder is inflated to a pressure between 2 and 50 pounds per square inch; the resin is injected using a vacuum; the vacuum is between 24 and 29 inches of mercury; and the resin is injected at a pressure between 2 and 50 pounds per square inch.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Reference is now made to the drawings for further descriptions relating to the composite pile of the present invention and its associated method of manufacture or fabrication. In essence, the fabrication can be considered as being carried out in two main steps, first a fabrication of the laminate and second, the molding or forming process itself.

Figure 7:
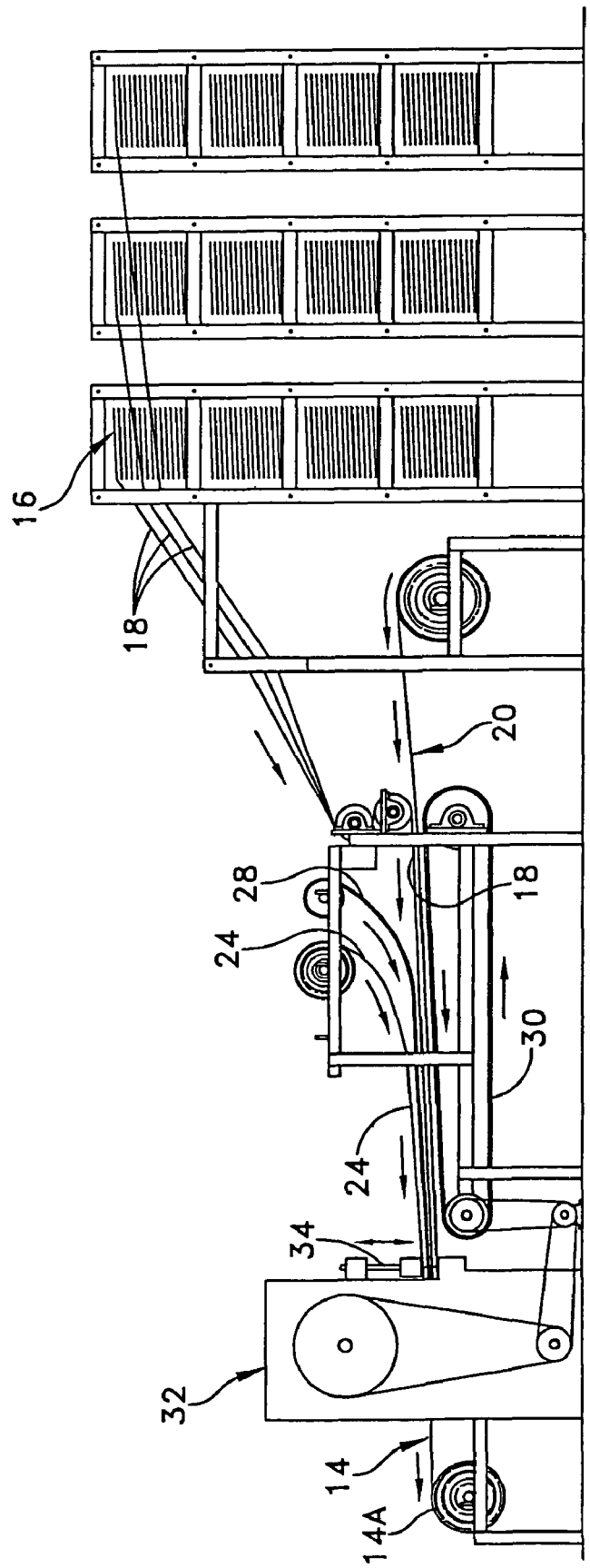
FIG. 7 is a side elevation view illustrating the various components in FIGS. 1-6 used in conjunction with a needle loom to provide a rolled-up laminate material.
Figure 8:
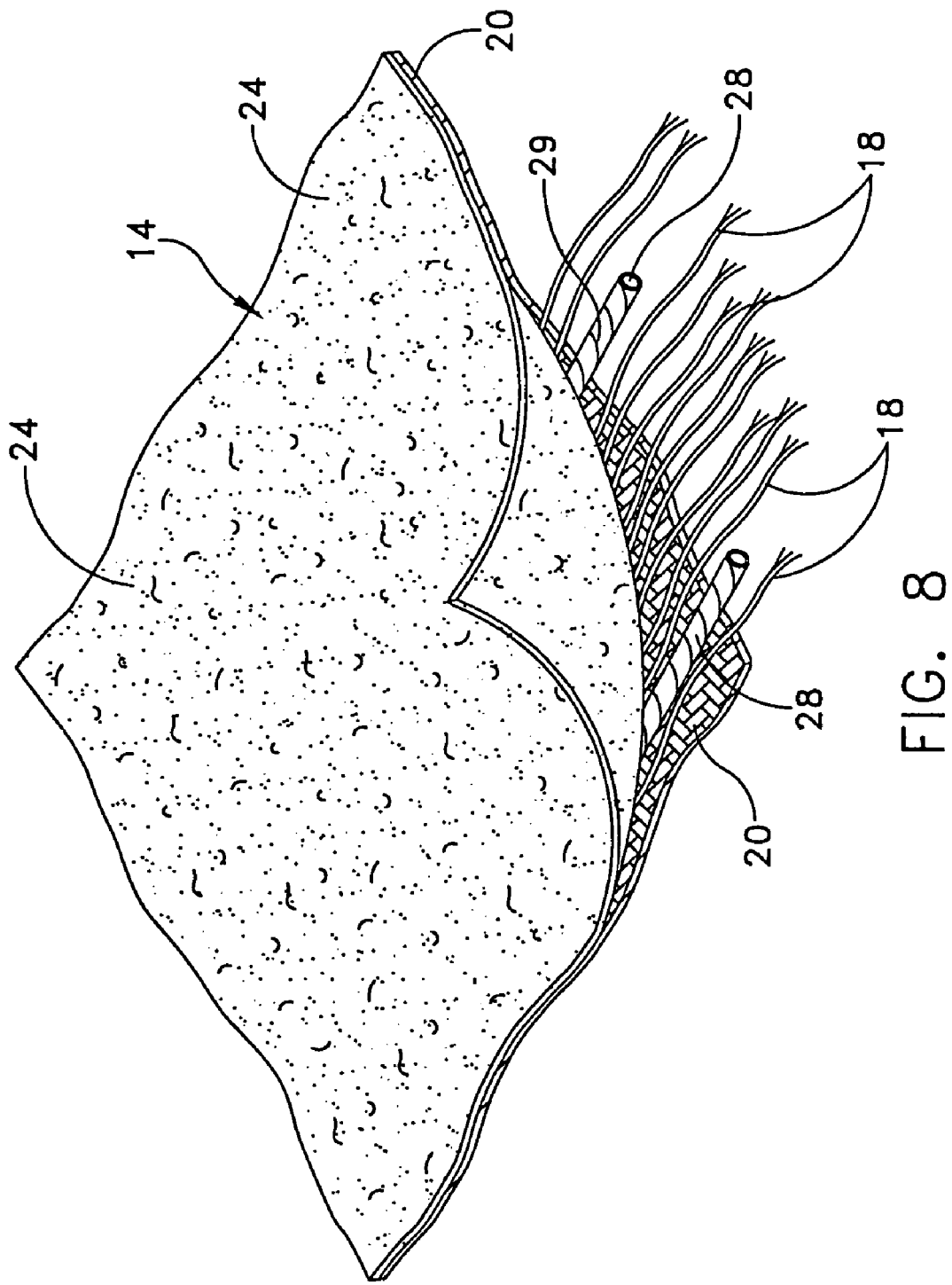
FIG. 8 is a perspective view showing the initial laminate as formed and the various components thereof.

FIGS. 1-6 illustrate the components or layers that are used in fabricating the laminate. FIG. 7 schematically illustrates the apparatus that may be used in bringing the layers together to form the laminate. FIG. 8 illustrates the formed laminate construction.

FIGS. 9-20 are illustrative of steps and associated apparatus for carrying out those steps in the molding process.

Figure 2:
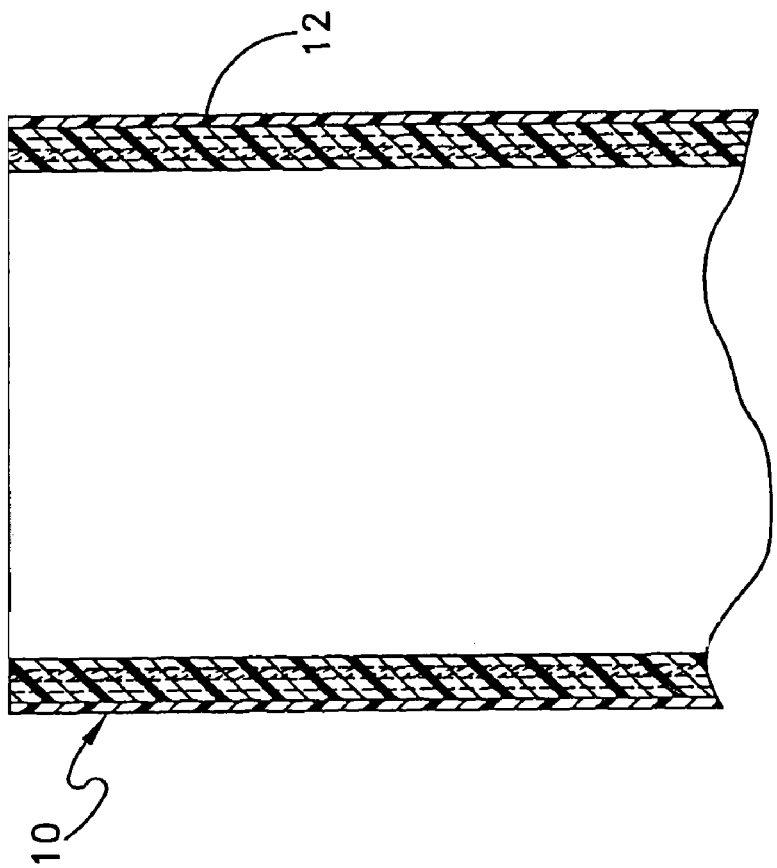
FIG. 2 is a cross-sectional view through the pile as taken along line 2-2 of FIG. 1.
Figure 1:
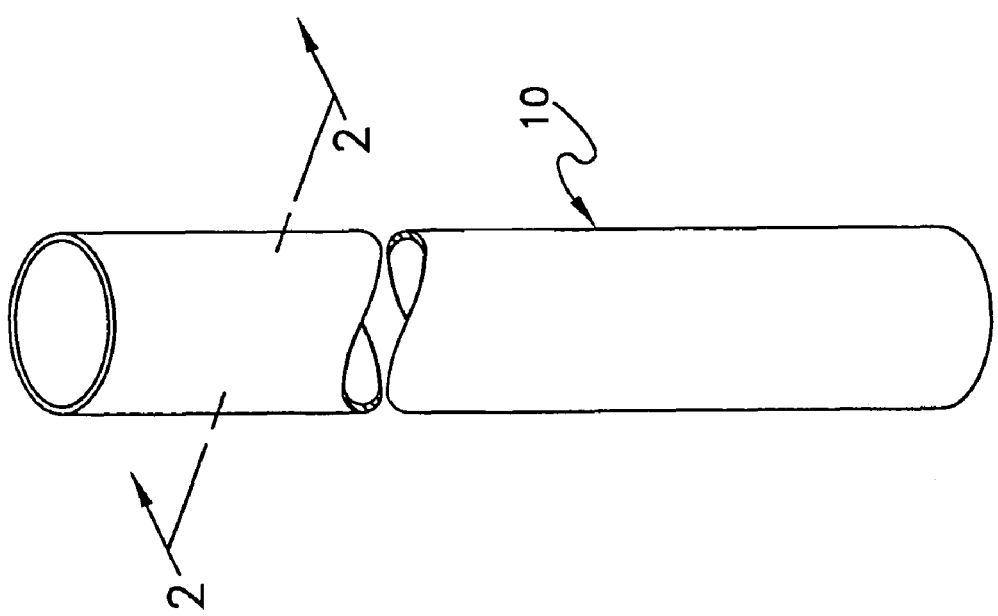
FIG. 1 is a simplified perspective view of a composite pile constructed in accordance with the present invention.

FIG. 1 is a perspective view of a composite pile 10 constructed in accordance with the principles and methods of the present invention. FIG. 2 is a cross-sectional view taken along line 2-2 of FIG. 1 illustrating some further details of the composite construction in the form of multiple layers 12. FIGS. 3-6 illustrate the materials used in the preferred embodiment of the present invention for constructing the laminate. FIG. 7 shows one apparatus that is used to form the laminate. FIG. 8 is a perspective view illustrating the finished laminate 14.

Figure 3:
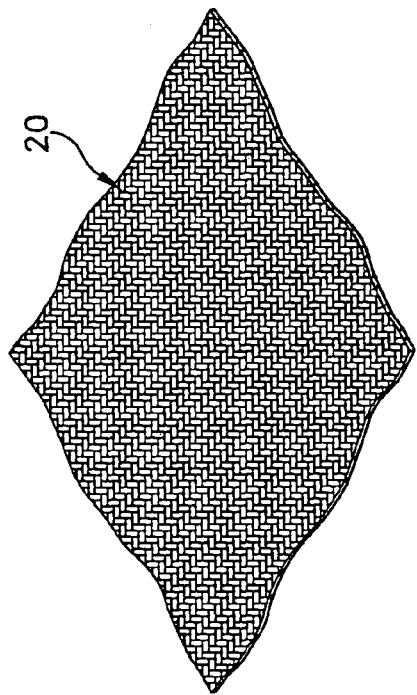
FIG. 3 is a perspective view of a roll of single strand fiberglass material used in constructing one of the layers of the laminate.

FIG. 3 illustrates a roll 16 of a continuous single strand fiberglass. The strand 18 is a continuous fiberglass roving with a per bundle yield of between 53 yards per pound and 625 yards per pound, grouped, spread and controlled to yield between 30 oz. per square yard and 250 oz. per square yard of unidirectional reinforcement. This forms one of the middle layers as illustrated in FIG. 8.

Figure 4:
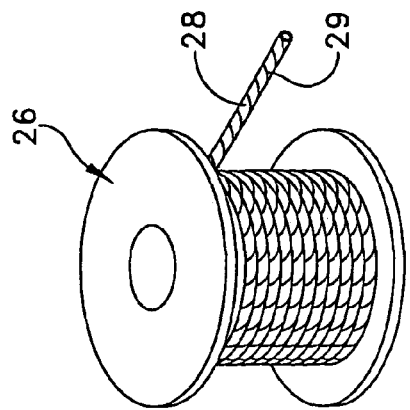
FIG. 4 is a perspective view of a fiberglass cloth used in constructing another layer of the laminate.

FIG. 4 is a perspective view of what may be considered the bottom layer 20. Layer 20 may be a woven roving fiberglass cloth with a density ranging from 12 oz. per square yard to 48 oz. per square yard. As illustrated in FIG. 4, in this particular embodiment the fiberglass is in a quilt pattern. The layer 20 may be considered as having hoop strands and vertical strands. It is preferred that the layer 20 be heavier in the hoop direction, greater than 50% and lighter in the vertical direction, less than 50%. More particularly, the hoop or annular strands are preferably about 80% in number and the vertical about 20% in number. In other words the fiberglass strands are more robust in the hoop direction either in diameter or in number of them.

Figure 5:
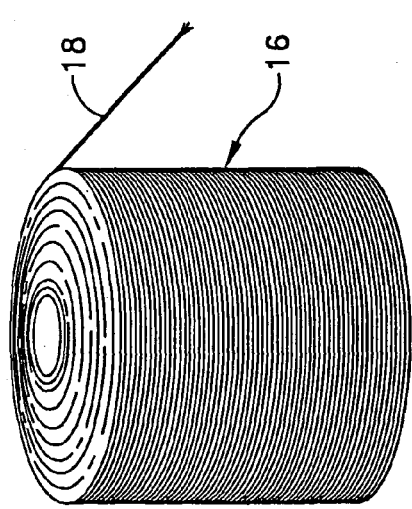
FIG. 5 is a perspective view of a random fiberglass mat used in constructing still a further layer of the laminate.

FIG. 5 is a perspective view illustrating a further layer 24 that may be considered as the top layer. This may be in the form of a continuous strand fiberglass mat or distributed random fiberglass filaments of 12 oz. per square yard to 48 oz. per square yard woven roving fiberglass cloth. In both FIGS. 4 and 5, the fiberglass material is shown in a layer form, however, as illustrated in FIG. 7, this material is typically kept on a roll and dispensed therefrom, such as in the manner illustrated in FIG. 7.

Figure 6:
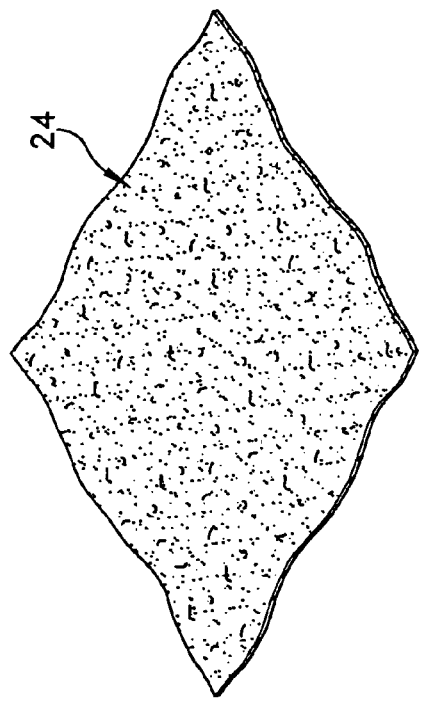
FIG. 6 is a perspective view illustrating the pervious conduit used in constructing a laminate of the present invention.

FIG. 6 illustrates a spool 26 that carries a plastic pervious conduit 28. The conduit 28 is hollow and is provided with a continuous spiral slot 29. This is adapted to form one of the middle layers of the laminate 14. The conduit 28 is instrumental as a means for conveying resin into the laminate in the manufacturing process that is to be described herein. The conduits of channels 28 may be single or multiple channels that extend within or on either side of the laminate. These pervious membranes may be incorporated into the fabric or used as discrete components added during the wrapping operation. The channels can possibly be either left in the pile or removed upon curing.

FIG. 7 is a schematic illustration of the apparatus that may be used in forming the laminate 14. At the left end of FIG. 7, laminate 14 is shown being wound into a roll 14A. The other materials illustrated in FIGS. 3-6 are also supported in roll form and may be driven by a conveyor belt 30 or the like so as to convey each of the layers in a layered manner to form the final structure as illustrated in FIG. 8. The layers 20 and 24 are continuous layers or sheets and one of the middle layers is formed by individual filaments or strands 18.

In a preferred embodiment of the invention, the various layers are loosely connected together with the use of a needle loom 32 that may be of conventional design. FIG. 7 illustrates a needle 34 of the needle loom. In actuality a plurality of these needles are disposed in an array across the laminate. The needles force the fiberglass strands from the top layer 24 through the unidirectional layer and the bottom woven roving layer. The driven fiberglass strands remain as vertical reinforcements or threads that bind the layers together sufficiently so that the created fabric is robust enough to be handled for the subsequent molding process. The degree of needling is minimized to prevent a reduction of the physical properties of the unidirectional middle layer formed by the strands 18. The joined fabric from the needle loom 30 is wound and rolled up continuously as it is processed. The width of the material is controlled in accordance with the desired dimensional requirements of the finished composite pile.

FIG. 8 illustrates the various layers that comprise the laminate 14. In addition to the two outside layers 20 and 24, there are also the individual spacedly disposed strands 18, as well as the spaced tubing pieces 28. Preferably, the spacing between the tubing pieces is greater than the spacing between the individual strands 18. Tubing pieces 28 are embedded within the layers and will subsequently be coupled to, so as to inject resin into the laminate construction.

Figure 9:
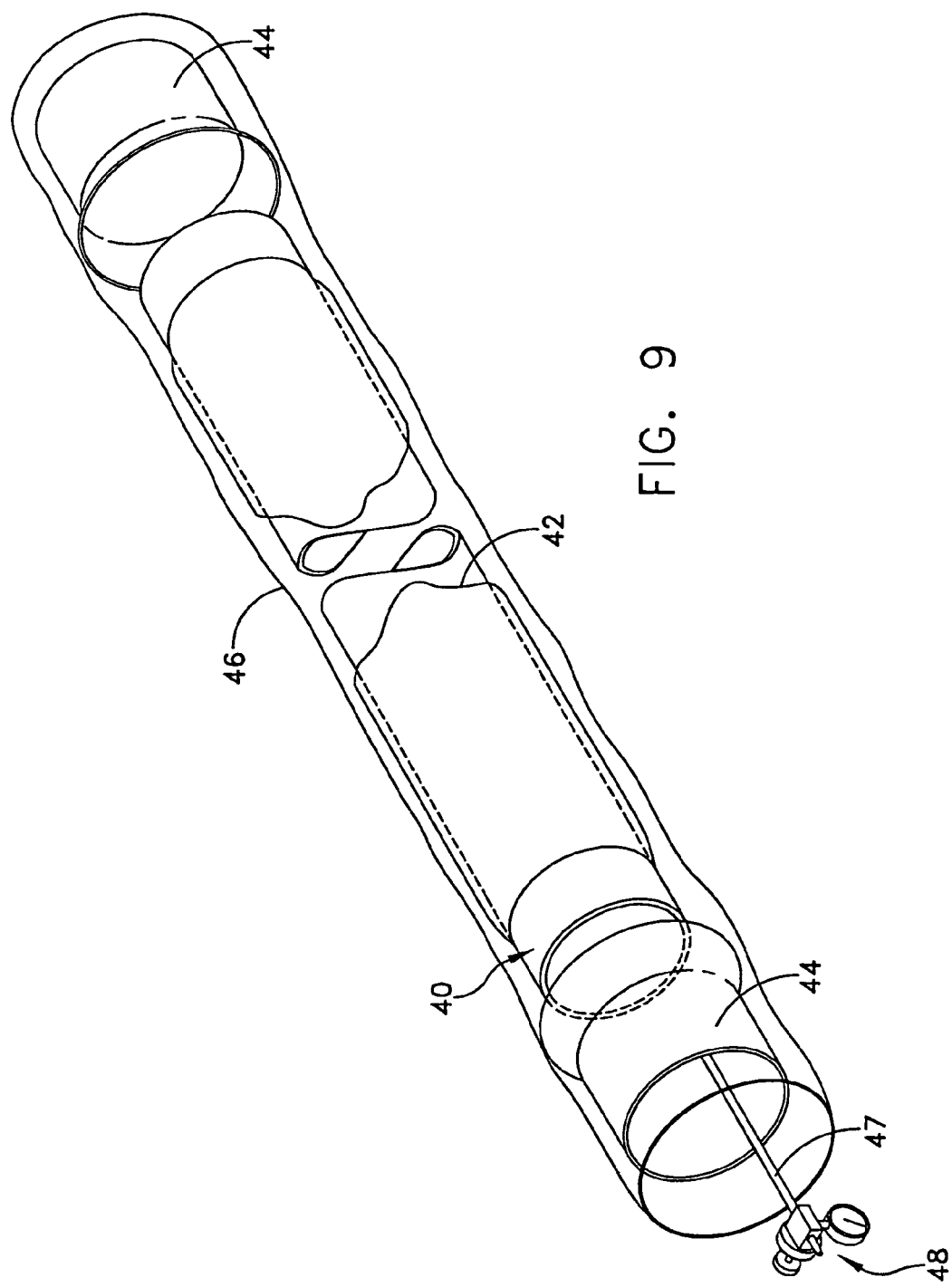
FIG. 9 is a perspective view illustrating a component used in the manufacturing process, namely a mandrel and associated inflatable bladder.

Reference is now made to FIGS. 9-20 for further illustrations of the molding process that is used in converting the formed laminate 14 into a final tubular composite pile or pier. For this purpose there is provided a mandrel 40 that is typically in the form of a metal pipe of an outer diameter smaller than the inner diameter of the composite pile that is to be fabricated. About the mandrel 40 is an inflatable bladder 42. The ends of the bladder 42 are provided with end caps 44. By providing separate end caps, one can mold various length piles using the same mandrel, but with different length bladders. FIG. 9 also shows a plastic sleeve or bag 46 that may be wound or formed about the mandrel and bladder, such as by being slid over the mandrel. A line 47 coupled to a regulator 48 controls the inflation pressure to the bladder 42.

Figure 10:
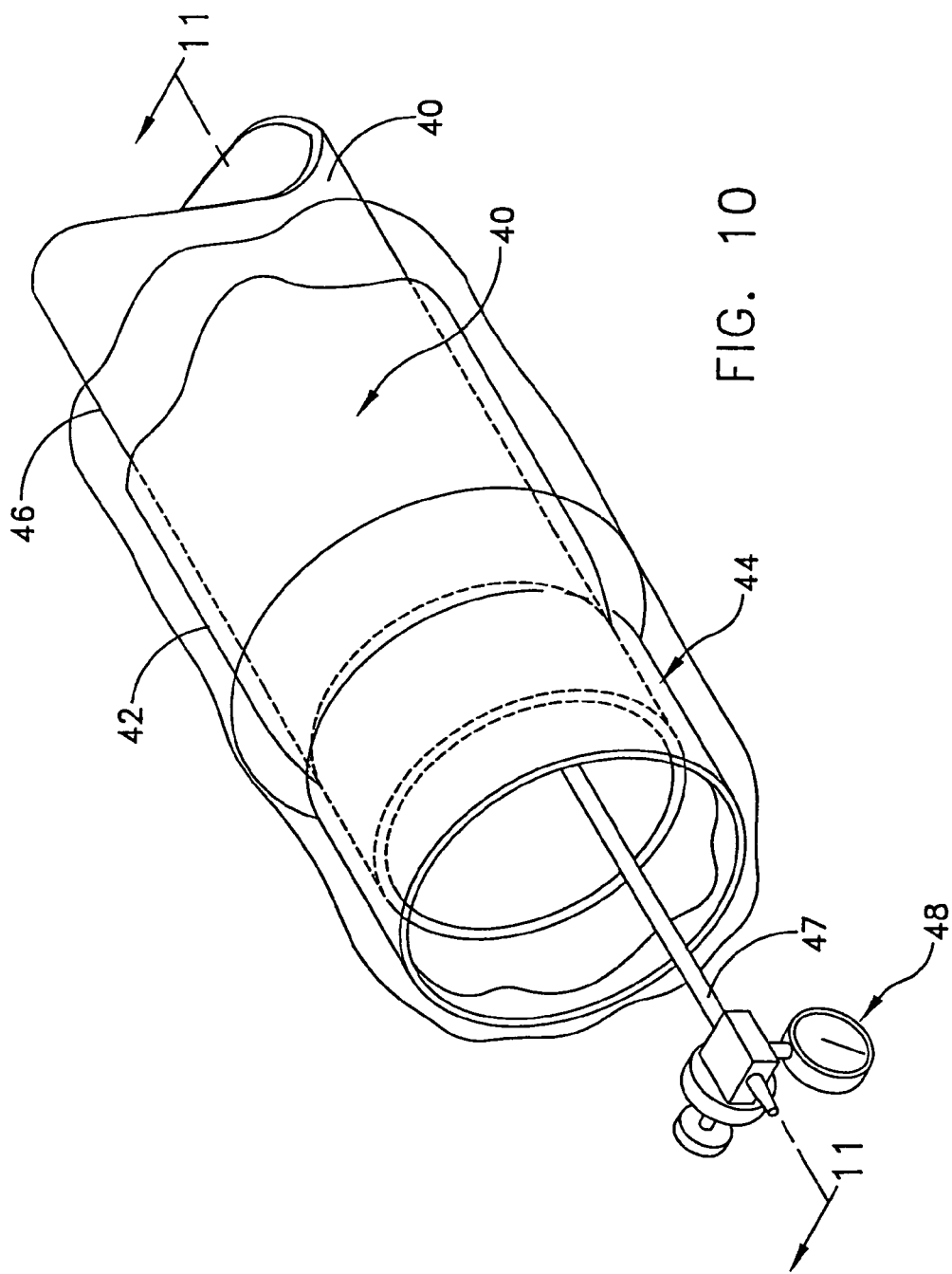
FIG. 10 is a perspective view similar to that shown in FIG. 9 and enlarged at the end cap area of the mandrel.
Figure 11:
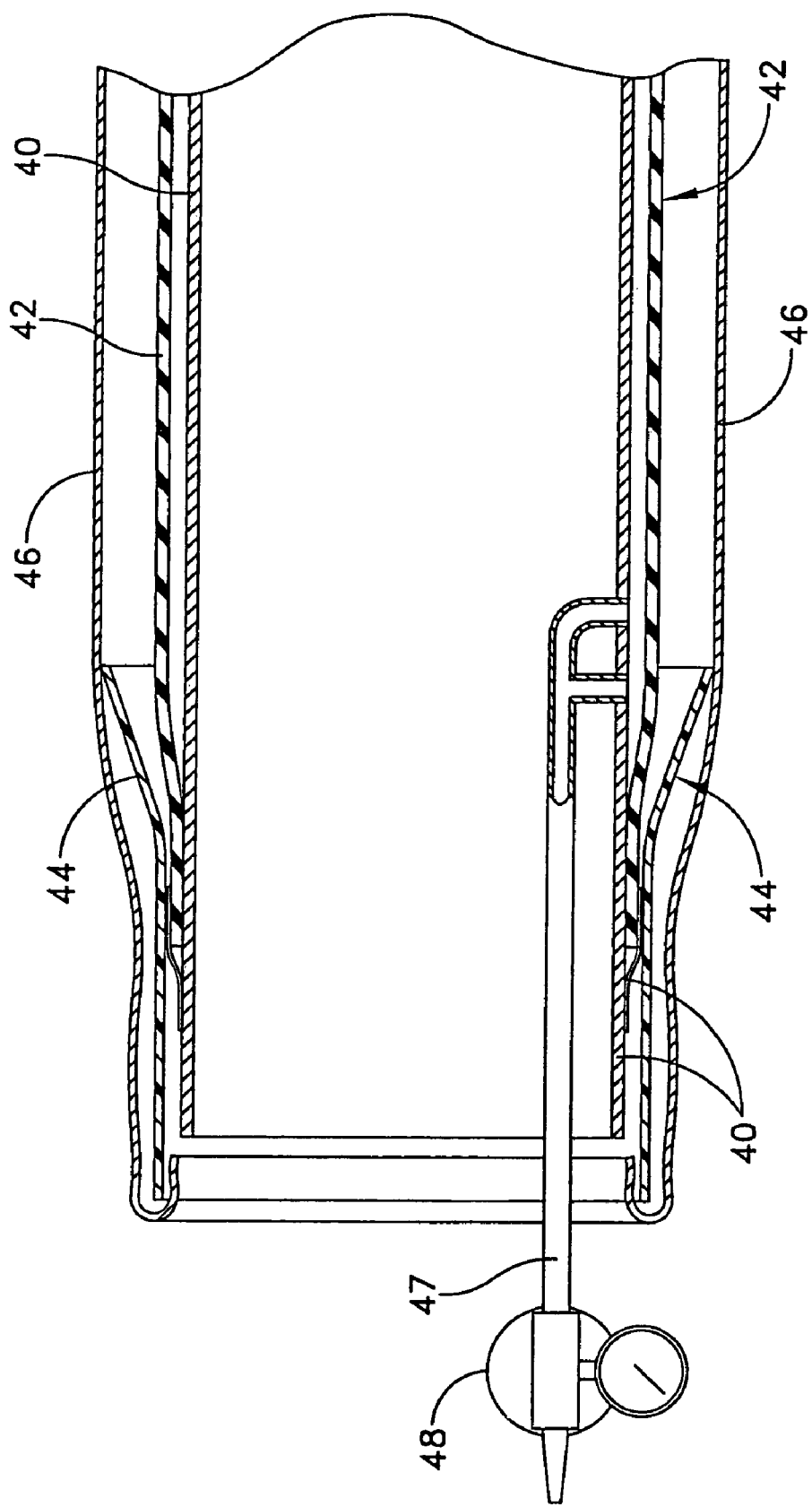
FIG. 11 is a cross-sectional view taken along line 11-11 of FIG. 10.

FIGS. 10 and 11 show further details of the mandrel and bladder construction. In FIGS. 10 and 11 the bladder is in its deflated state, the end cap 44 is in position sealing or restraining the end of the bladder and the plastic sleeve 46 is disposed about the mandrel sleeve and end cap.

Figure 12:
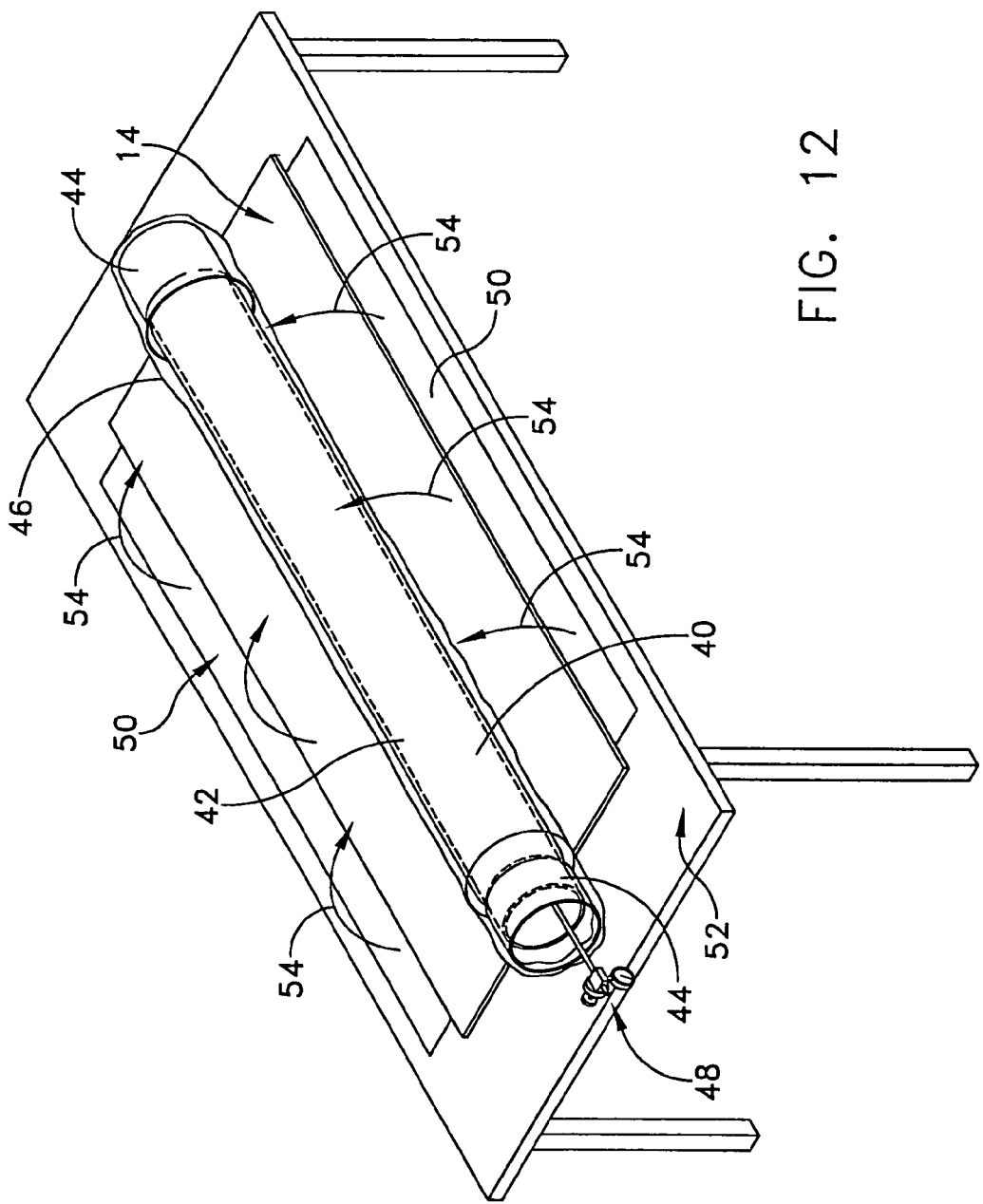
FIG. 12 is a perspective view illustrating the manner in which the laminate is wrapped about the mandrel and bladder.

Reference is now made to FIG. 12 for an illustration of an initial step in the molding process. The mandrel and bladder with its sleeve 46, as a unit, are placed on the table 52 over the previously formed laminate 14 and an outer plastic layer or skin 50. The outer layer 50 may be PET (polyethylene terephthalate). Other materials for layer 50 may comprise one or more of polypropylene, polypropylene terephthalate, polyethylene—oriented or high molecular weight, acrylonitrile-butadiene-styrene, styrene-acrylonitrile, polyimides and a variety of other engineering thermoplastics. The laminate 14 and the layer 50 are wrapped about the mandrel and bladder. Initially, the laminate 14 and the layer 50 are placed on the table 52. The edges of the various layers or plies are exactly aligned so as to facilitate the appropriate overlap and thicknesses in the wall of the finished product. As indicated previously, the metal mandrel with its inflatable bladder is covered with a polyethylene or nylon sleeve 46. The bladder about the mandrel is inflated to a predetermined size and is then placed on top of the laminate on the table 52, as illustrated in FIG. 12. The table 52 may be provided with mechanical arms which wrap the laminate around the mandrel in a controlled fashion so that the overlaps are accomplished with a high degree of accuracy. This wrapping about is illustrated by the series of arrows 54 in FIG. 12. The outer skin or layer 50 may be taped, glued or heat sealed so as to provide the desired outside diameter of the finished pile.

Figure 13:
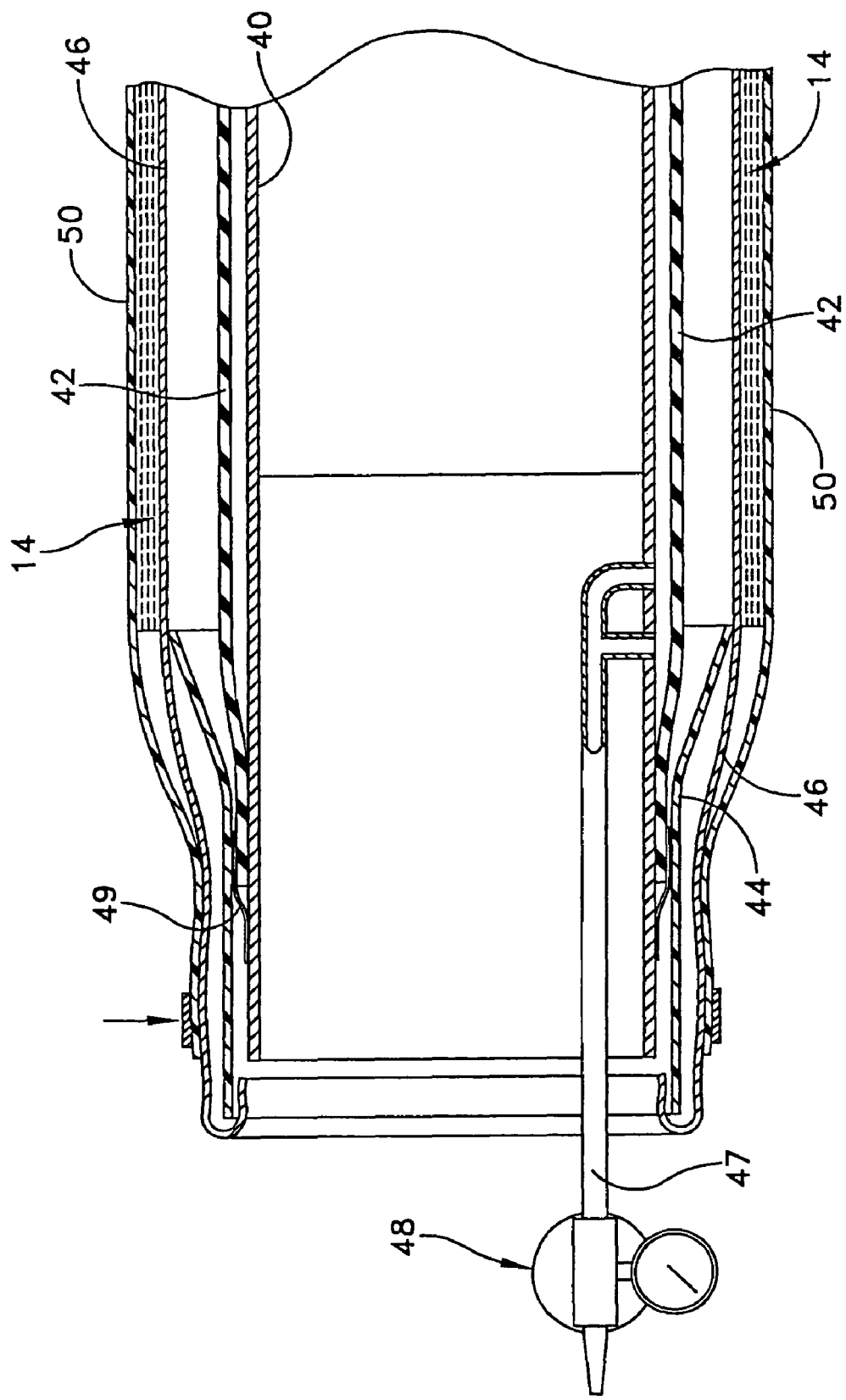
FIG. 13 is a cross-sectional view similar to that illustrated in FIG. 11 with the laminate in place.

Reference is now made to the cross-sectional view of FIG. 13. This illustrates the fully wrapped configuration of the laminate about the sleeve 46. FIG. 13 also illustrates the application of the end cap 44. There may also be provided a tape 49 for closing the end of the bladder 42. In FIG. 13 the bladder 42 is shown in its deflated condition.

Figure 14:
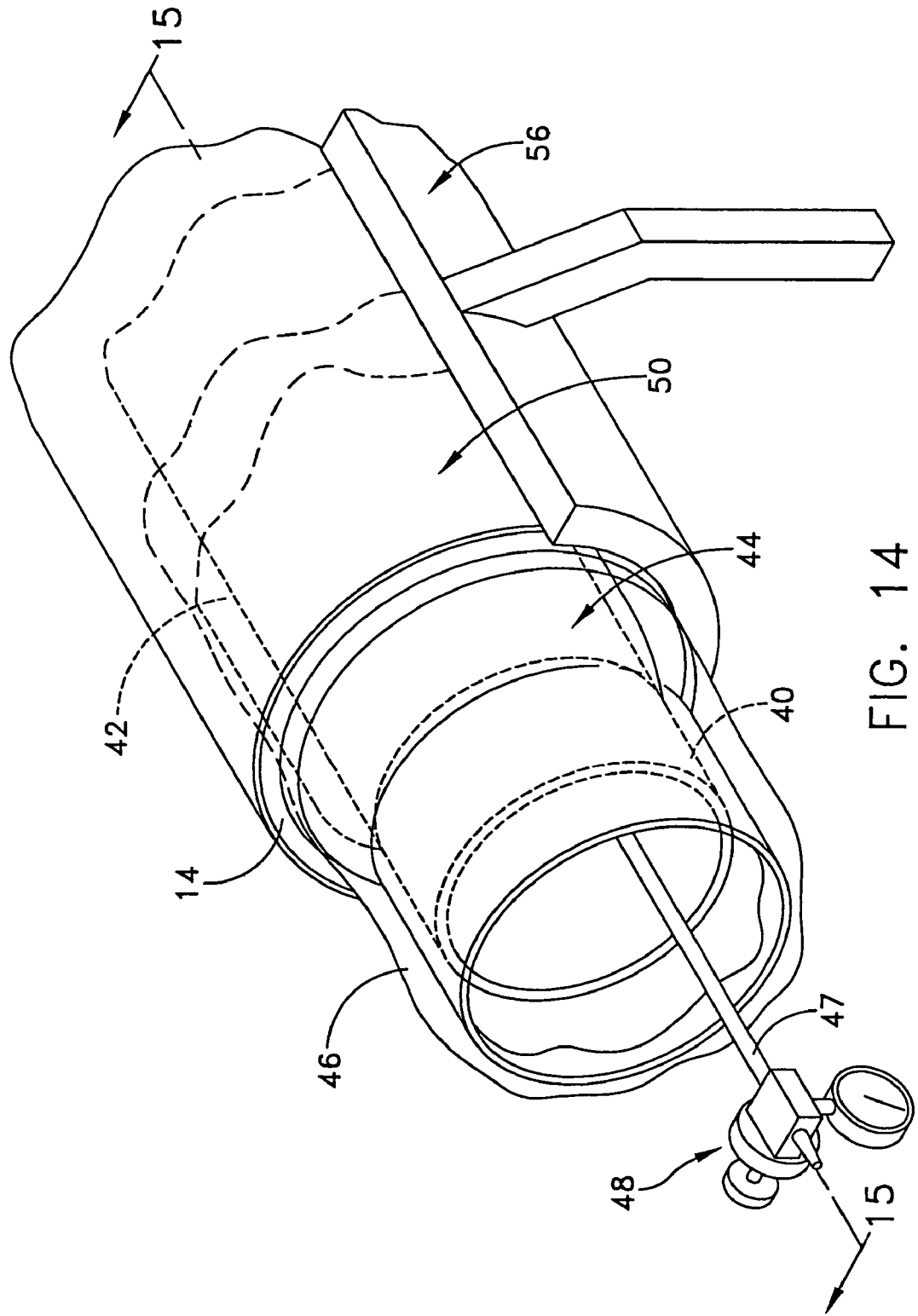
FIG. 14 is a perspective view showing the mandrel, bladder and laminate as supported in a partial mold or holder.

Reference is now made to the perspective view of FIG. 14. This illustrates the entire assembly resting in the holder 56. The holder 56 may also include a similar shaped top section so as to form a mold. However, in the preferred embodiment only a bottom part is used as illustrated by the holder 56 in FIG. 14.

Figure 15:
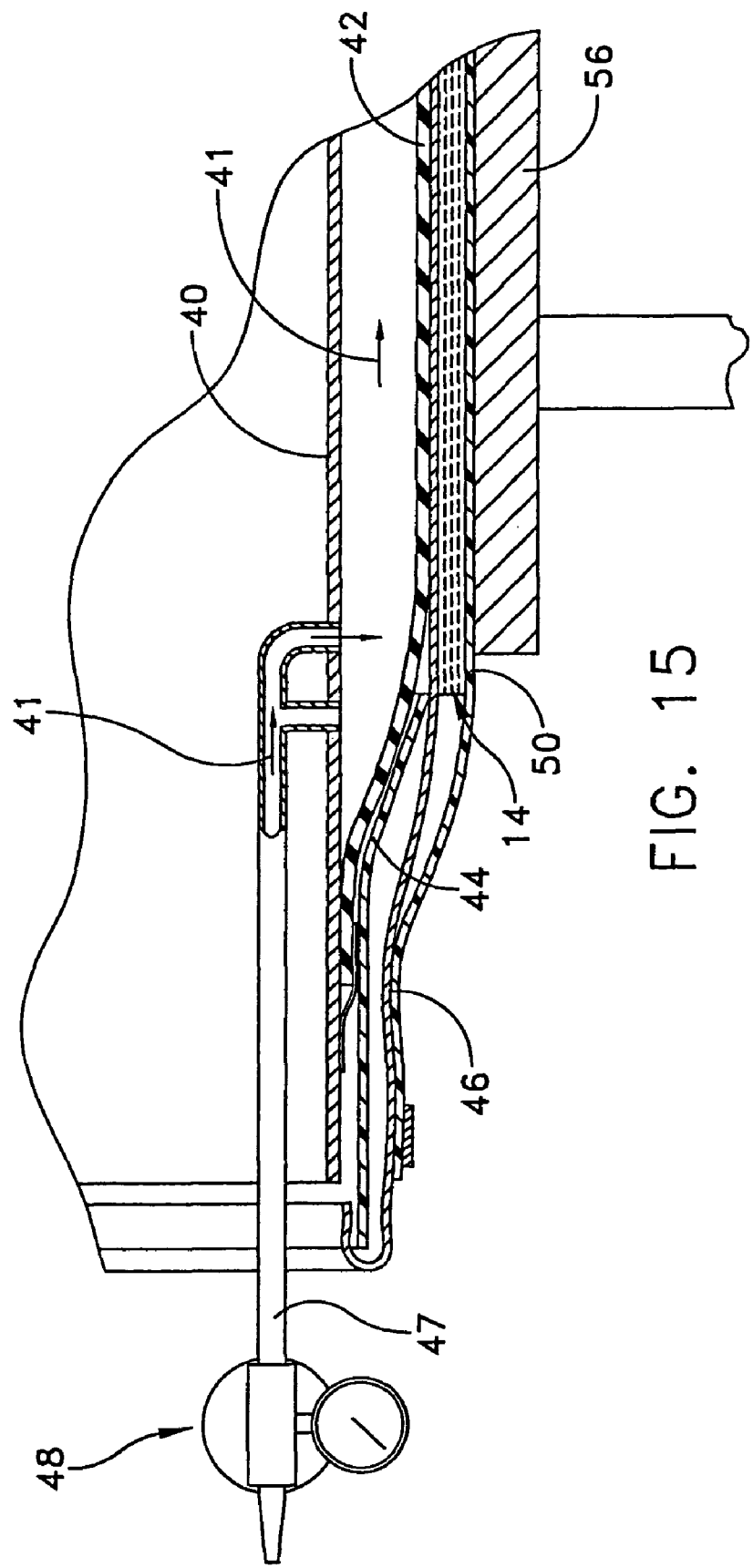
FIG. 15 is a partial cross-sectional view as taken along line 15-15 of FIG. 14.
Figure 16:
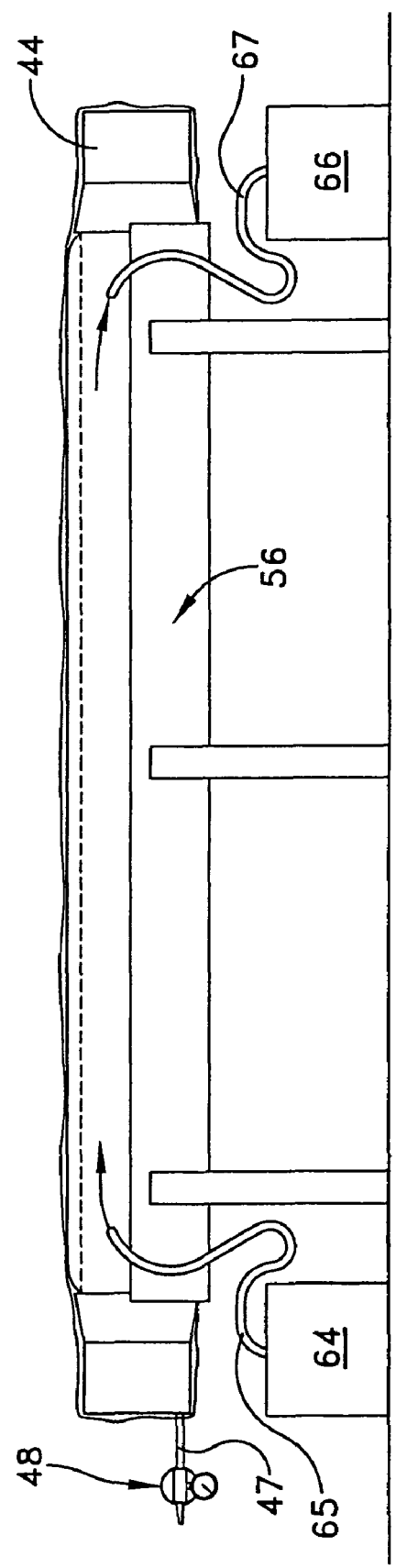
FIG. 16 illustrates the controls associated with the manufacturing process of the present invention.

FIGS. 14-16 illustrate the use of two end caps 44. The cross-sectional view of FIG. 15 illustrates the positioning of one of the end caps 44. The end cap at the opposite end is positioned in a similar manner. The end caps are applied to both ends of the mandrel. These caps provide a vacuum seal and may also be provided with orifices for both resin injection and vacuum application. Alternatively, the resin injection and vacuum may be as schematically illustrated in FIG. 16. FIG. 16 shows on the left a control box 64 for controlling the injection of resin into the laminate 14. The box 64 may include pressure means for pressurizing the resin via line 65. Preferably, the vacuum imposed at box 66 with the line 67 provides sufficient vacuum so as to draw the resin through the laminate. In this instance then the box 64 may simply be a reservoir for the resin material.

FIG. 15 illustrates a next step in the molding process. That is the step of inflating the bladder 42 by means of the application of pressure as indicated by the directional arrows 41. This provides a pressure on the inner surface of the tubular shaped laminate. The bladder on the mandrel is preferably inflated to a pressure between 2 and 50 pounds per square inch. The vacuum control at box 66 is controlled so that a vacuum of between 24 and 29 inches of mercury is applied to the laminate. A catalized thermosetting resin is injected into the laminate at a pressure (vacuum) between 2 and 50 pounds per square inch.

Figure 17:
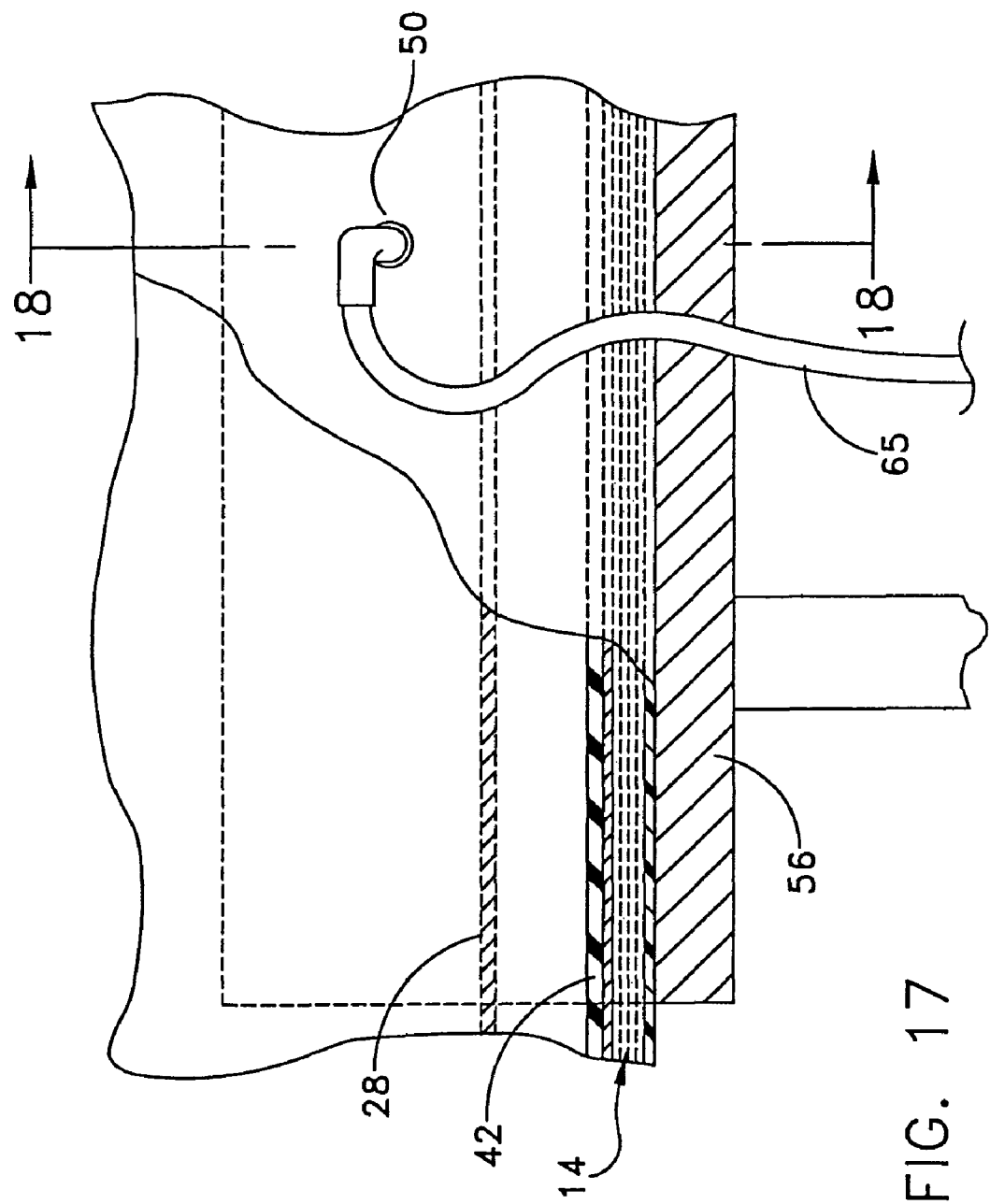
FIG. 17 is a cutaway sectional view associated with FIG. 14.

Reference is also now made to the cross-sectional view of FIG. 17. This illustrates the resin line 65 for coupling the resin material, drawn under vacuum, into the laminate construction. This line is coupled through the outer skin 50, as illustrated in FIGS. 18 and 19.

Figure 18:
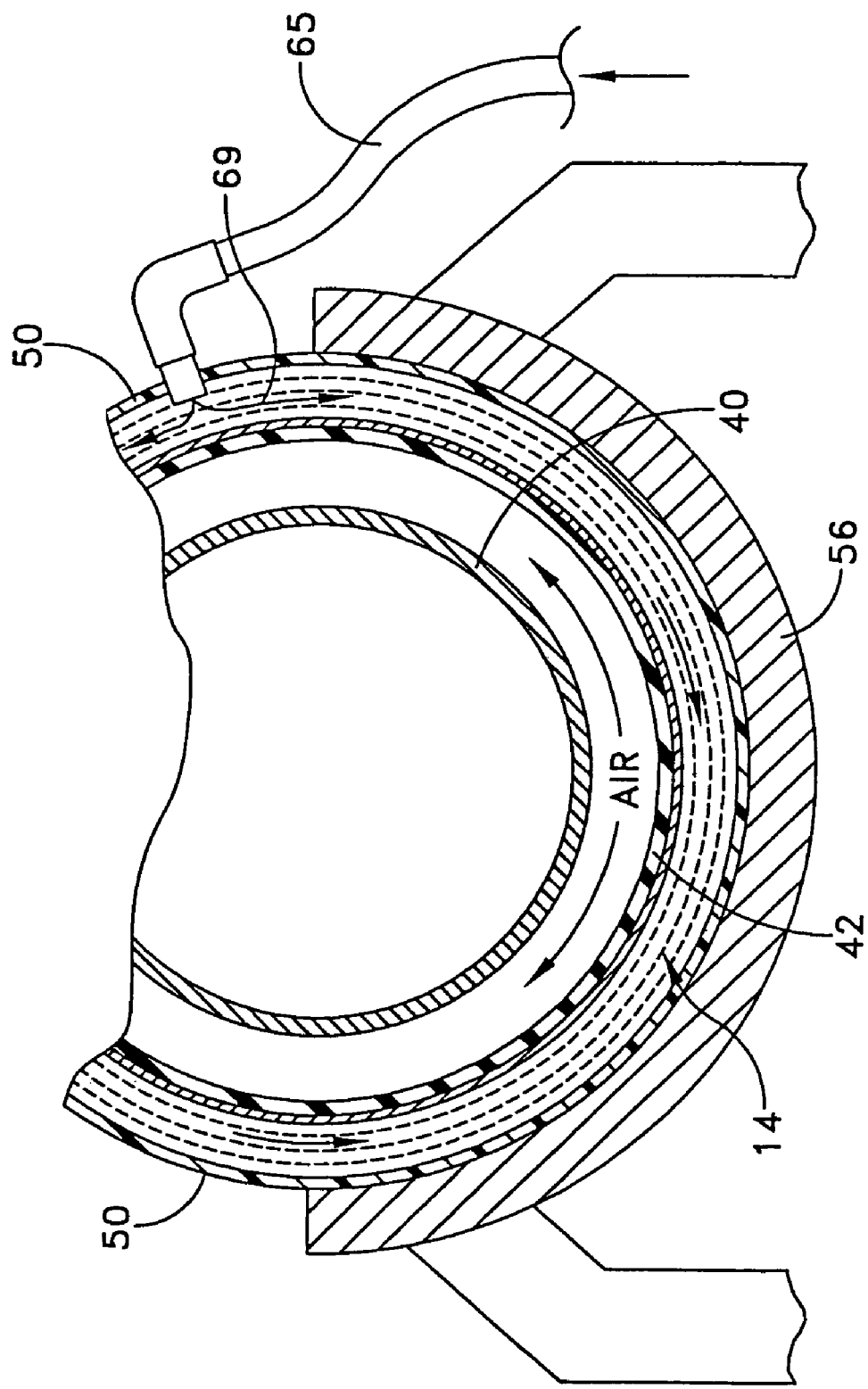
FIG. 18 is a cross-sectional view taken along line 18-18 of FIG. 17 illustrating the resin being injected or drawn into the laminate.
Figure 19:
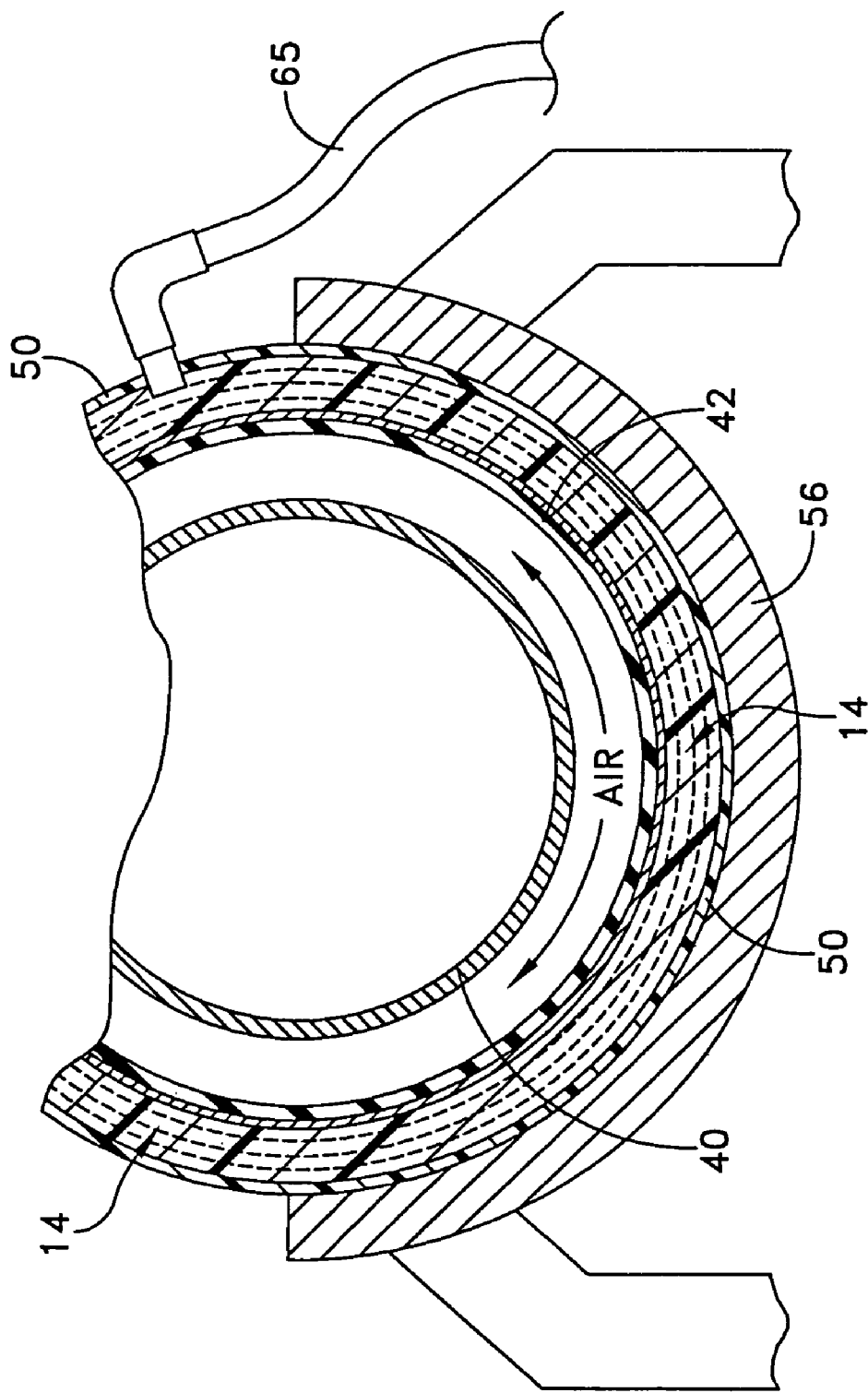
FIG. 19 is a cross-sectional view similar to that illustrated in FIG. 18 with the laminate having been filed with the resin.
Figure 21:
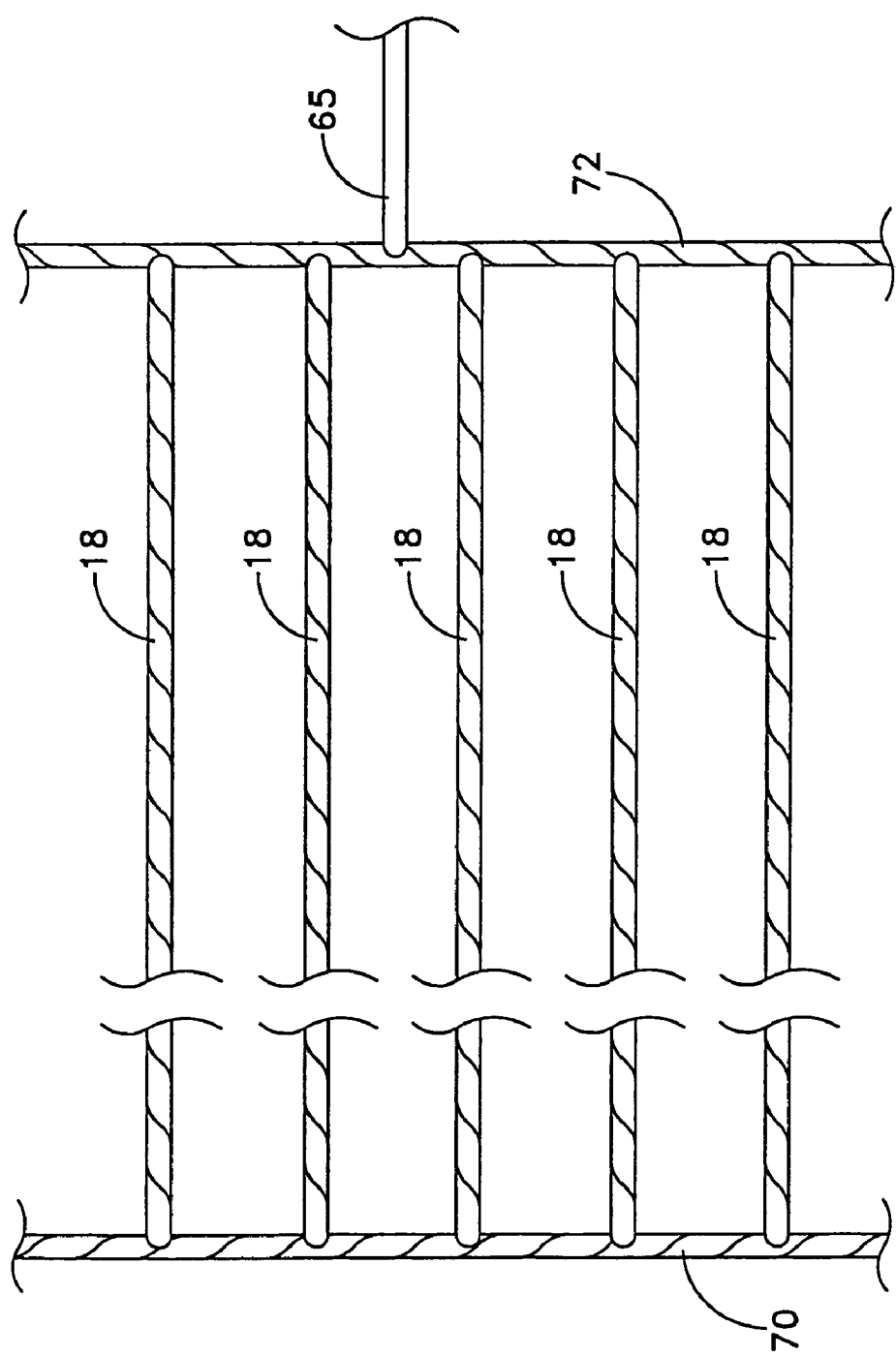
FIG. 21 is a schematic illustration of the structure used for resin injection.

FIG. 18 illustrates the resin by virtue of the arrows 69 being dispersed into the laminate 14. The resin is actually coupled directly into the pervious tubular members 28. It is through these tubular members 28 that the resin is distributed throughout the entire laminate. In this regard refer also to the schematic diagram of FIG. 21 that illustrates the inlet tube 65 coupling to the individual tubular members 18 by means of end tubes 70 and 72. The tubes 70 and 72 may be attached to the tubular members 18 prior to the initiation of the molding process. The ends of tubular members 18 fluidly couple with the tubes 70 and 72.

Figure 20:
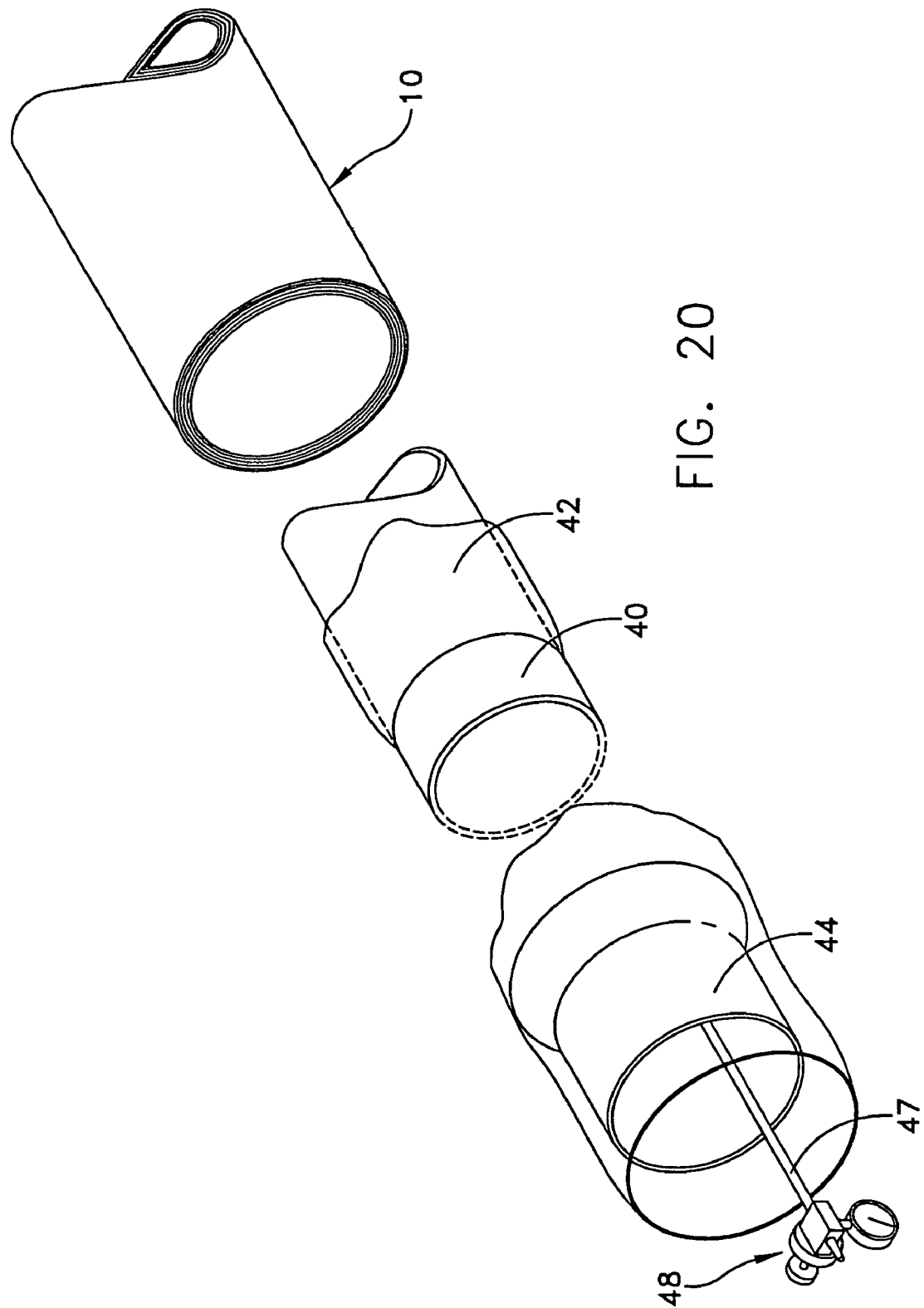
FIG. 20 illustrates a last step in the manufacturing process, namely removing the finished pile or pier from the mandrel, bladder and end caps.

As indicated previously, the tubular members 18 have a continuous spiral slot. It is through this slot arrangement that the resin can pass as it is sucked along each of the tubular members. FIG. 19 illustrates, by large cross-section lines, the final filling of the laminate 14. FIG. 20 illustrates some of the final steps in the process. After the resin has gelled, the bladder is deflated and a vacuum is applied to the bladder to draw it in. The end caps are removed from the mandrel. The bladder and mandrel are extracted from the finished pile. The pile is removed from the holder, trimmed, inspected and is ready for use.

Figure 22:
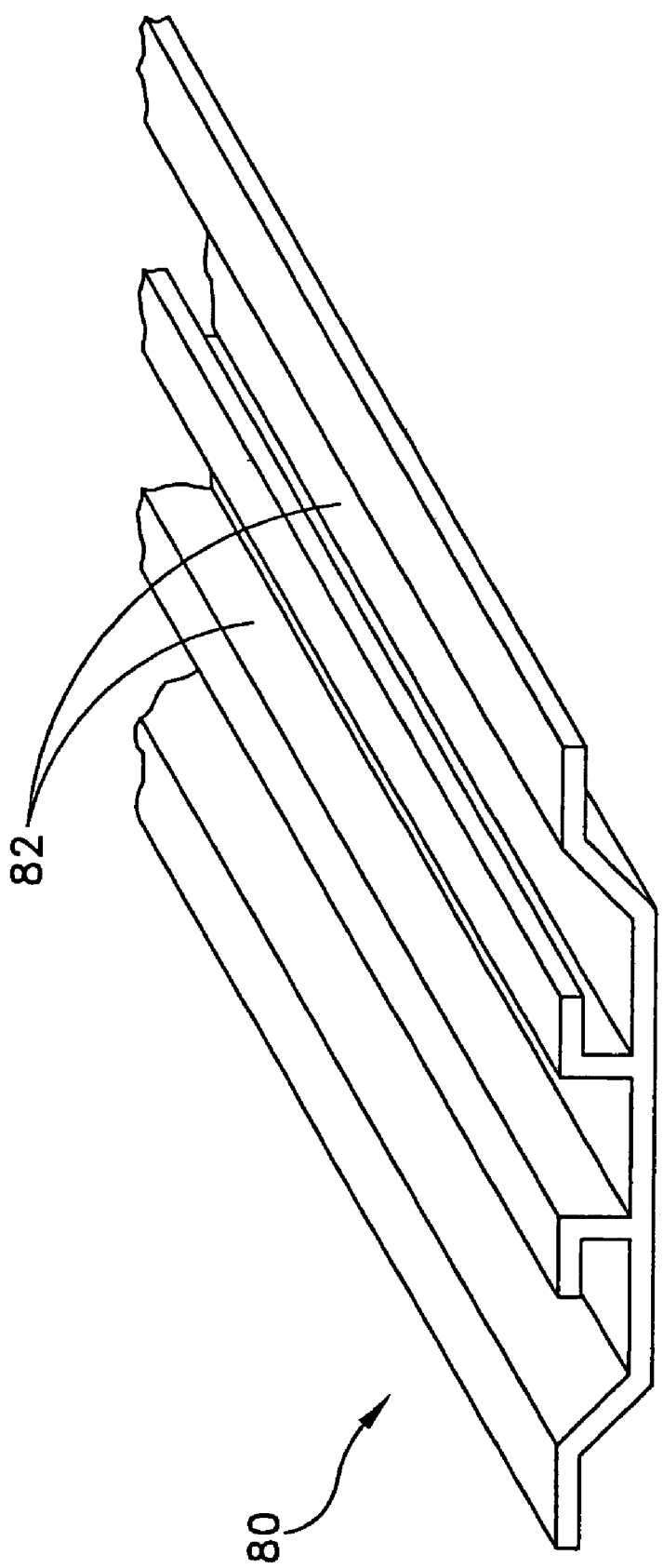
FIG. 22 shows an alternate flow channel that can be used with the process and product of the present invention.
Figure 23:
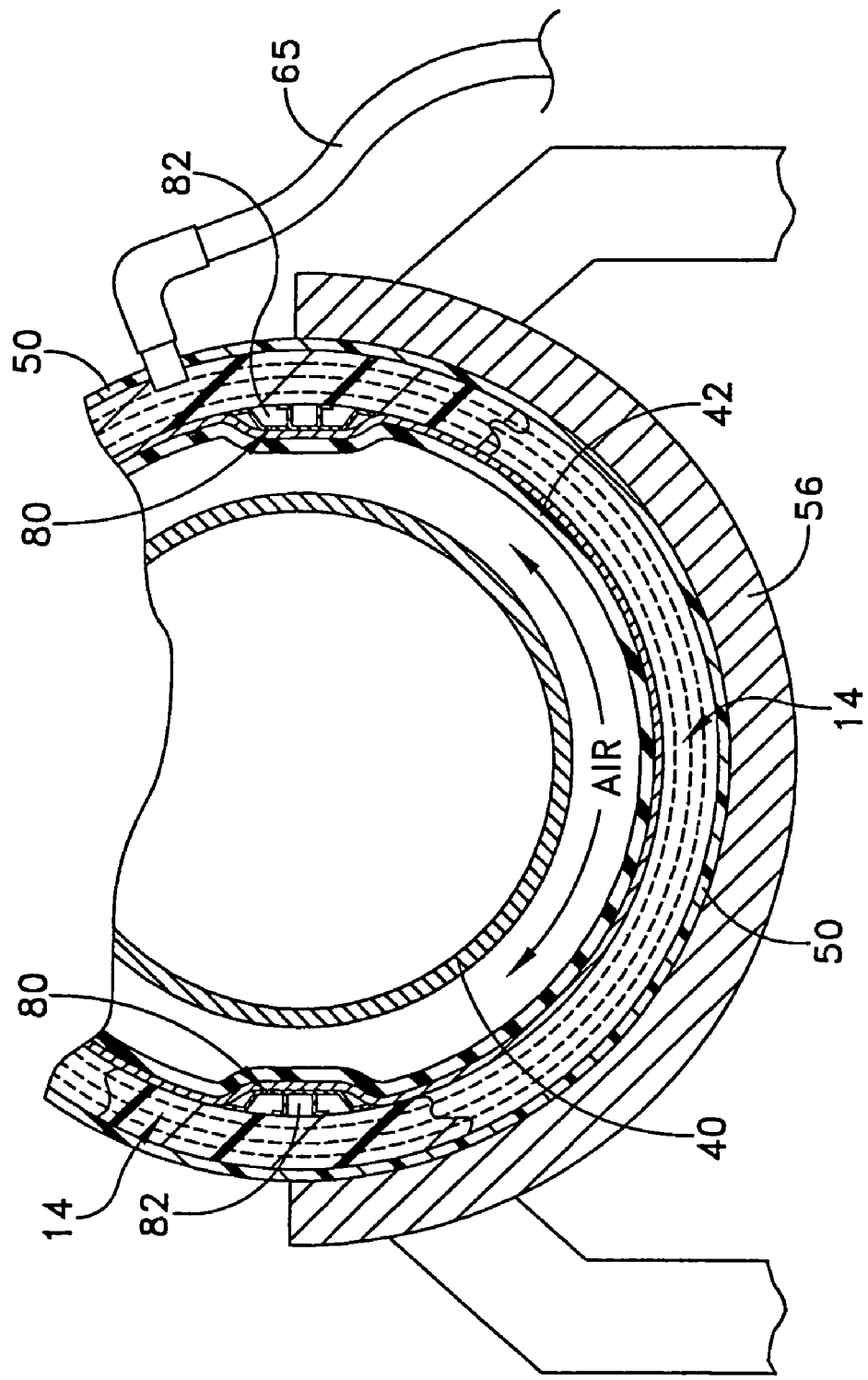
FIG. 23 is a cross-sectional view similar to that of FIG. 19 but illustrating the flow channel of FIG. 22.

FIGS. 22 and 23 illustrate an alternate embodiment of the invention in which the flow channels are on the inside of the laminate under the internal poly bag. FIG. 22 shows the channel itself comprised of a unitary structure 80 having a series of parallel arranged channels 82 that extend the length of the laminate. The resin is forced by vacuum through the channel 82 and dispersed through the open channels into the laminate. The structure 80 may be formed as part of the final fabricated product as it remains on the interior pile surface. In one embodiment the structure 80 may be used, as illustrated in FIG. 23 in diametric positions. A greater number or smaller number of structures may be used, but preferably at least two of them. Also, in an alternate embodiment the infusion can occur from the outside rather than the inside of the laminate through a flow channel apparatus.

Figure 24:
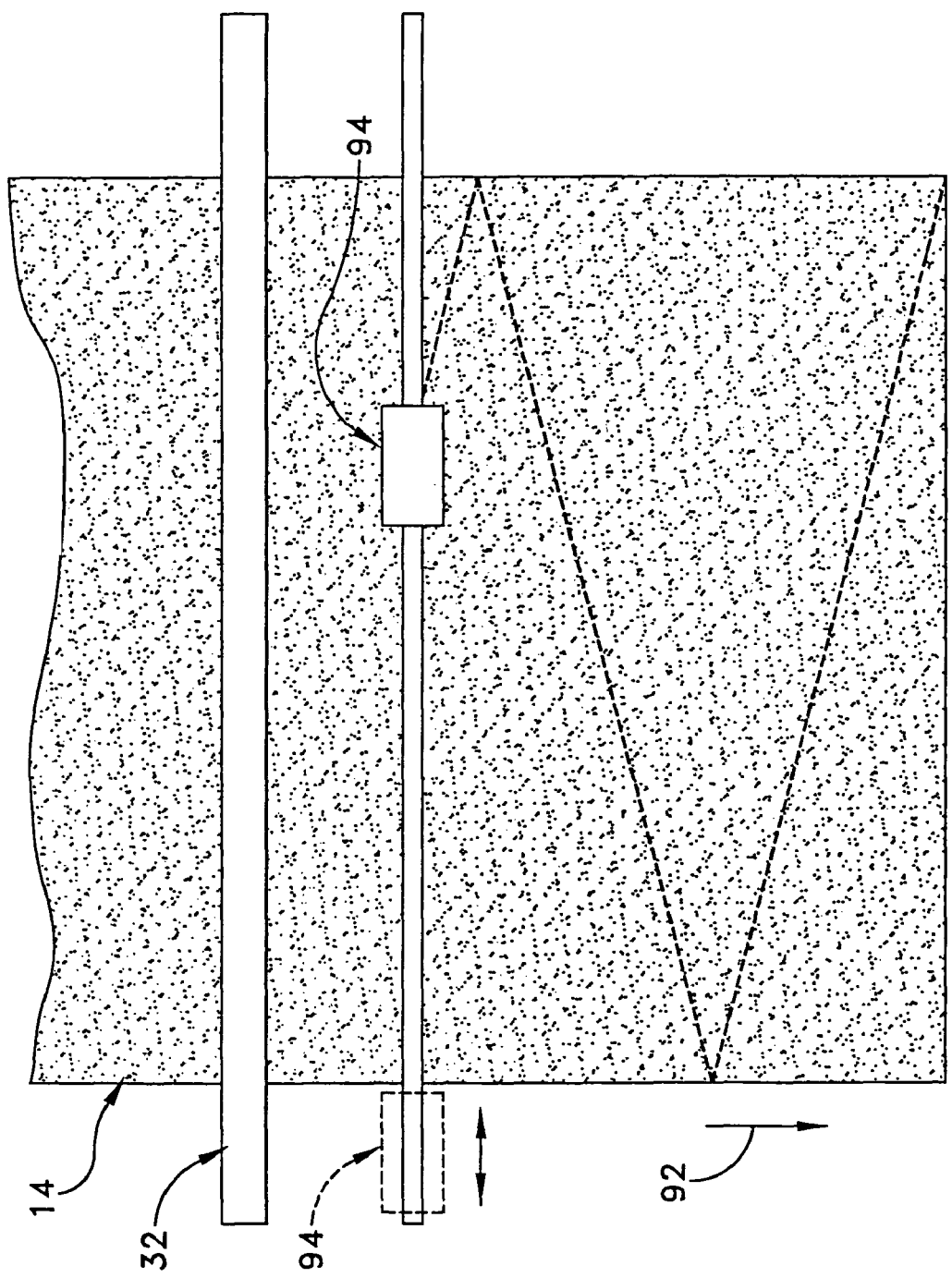
FIG. 24 schematically illustrates another technique for securing the laminate.

Another variation of the process is schematically illustrated in FIG. 24 wherein the securing of the laminate layer comes about by a sewing technique which may either be used in conjunction with the needle technique or used in stead of the needle loom. FIG. 24 shows the laminate at 14 progressing in the direction of the arrow 92. A sewing head 94 is shown traversing the laminate. Because the laminate is moving, a zig-zag sewing pattern or stitching 90 is made in the laminate. Of course, other sewing patterns may also be used as long as there is sufficient sewing to hold the laminate together at least temporarily. FIG. 24 also schematically shows the loom 32. As indicated, in FIG. 24 both the needle loom and sewing head may be used. In an alternate embodiment either the sewing head or the needle loom may be used.

Thus, it can be seen that in accordance with the present invention certain of the layers, particularly the outer layers can essentially form a mold unto themselves, while at the same time functioning as a part of the final composite structure. This enables the process to be carried out in a simple manner with the resin being injected between these inner and outer tubular layers, identified herein as layers 46 and 50.

The inner and outer skins, also identified herein as layers 46 and 50, not only form the inner and outer surfaces of the composite pile but also, in some embodiments disclosed herein, function as a mold about the laminate. These skins are used during the infusion process. The outer skin chemically bonds to the laminate as it is cured. The inner skin may not bond with the laminate. The exterior skin serves as an abrasion resistant surface on the exterior of the composite pile. This surface material, which can be applied in various colors, also serves to protect the fiberglass laminate from degradation due to UV rays. This material can be made of any abrasion resistant material that chemically bonds with the laminate. The thickness of this exterior skin can be increased or decreased depending upon the amount of abrasion resistance required for a particular application. By using the exterior skin as a mold, piles can be readily molded in any desired lengths.

The process of the present invention also lends itself to providing piles of constant diameter therealong or the process can also be easily modified to mold tapered tubes.

The use of an inflatable bladder about a rigid mandrel has proven to be quite successful in manufacturing a uniform composite pile. The use of an inflatable bladder about the mandrel allows pressure to be applied on the laminate from the inside, forcing it against the exterior skin of the composite pile. This provides the ability to push the polybag against the laminate and hold it in place as pressure is applied to the resin being infused. This speeds up the infusion process. If no bladder pressure were used, the increased resin pressure would overcome the vacuum pressure holding the polybag against the laminate, and resin would flow between the polybag and the laminate, rather than being forced through the laminate which is the desired effect. It is preferred to use a clear polybag on the outside of the laminate so that the infusion process can be readily observed and pressure and vacuum levels can be readily adjusted on a real time basis.

Having now described certain embodiments of the present invention and methods of fabrication, it should now be apparent to those skilled in the art that numerous other embodiments are contemplated as falling within the scope of the present invention. For example, the resin has been indicated as coupled to the laminate through a tubular member with a spiral slot. Alternatively, other open structures can be used as long as they have the characteristic of coupling the resin forward through the laminate and at the same time dispersing the resin along the laminate. The tubular resin-coupling members are spaced apart, such as shown in FIG. 8, and the dispersion of the resin gradually fills the space therebetween. The present invention also contemplates other flow channel arrangements as illustrated hereinbefore. As indicated previously, during the process a holder is used, however, this holder may also be provided with a second half to form a mold.

What is claimed is:

1. A tubular composite pile construction comprising:
   a pre-formed laminate of a plurality of fiberglass layers that are bound together, wherein the pre-formed laminate comprises:
   first and second layers of a fiberglass material;
   a plurality of fiberglass strands extending in a spaced unidirectional matrix and disposed between said respective first and second layers, and
   a plurality of pervious tube members extending between respective first and second layers and uniformly arranged so as to enable injection of a resin therethrough;
   a plastic inner skin on one side of the laminate and constructed and arranged to form an inner surface of the tubular pile;
   a plastic outer skin fixed to an opposite side of the laminate and constructed and arranged to form an outer surface of the tubular pile; and
   a resin injected into said laminate with the skins forming a mold for retaining the resin while also forming the respective inner and outer pile surfaces.

2. The construction of claim 1 wherein the pervious tube members receive the resin and inject the resin between the first and second layers.

3. The construction of claim 1 wherein at least one of the skins is made of PET.

4. The construction of claim 1 wherein the resin is injected with a vacuum.

5. The construction of claim 1 wherein the plastic outer skin is made of polypropylene terephthalate.

6. The construction of claim 1 wherein the tube members comprise spiral slotted members from which the resin can escape therealong.

7. The construction of claim 1 wherein the laminate is subjected to passage through a needle loom to form orthogonal fiberglass filaments for binding the layers together.

8. The construction of claim 1 wherein the laminate is subjected to passage through a sewing head.

9. The construction of claim 1 wherein said first layer comprises a woven roving fiberglass cloth.

10. The construction of claim 9 wherein the fiberglass cloth has a density of from 12 oz. per square yard to 48 oz. per square yard.

11. The construction of claim 9 wherein the woven roving cloth is heavier in the hoop direction, greater than 50% and lighter in the vertical direction, less than 50%.

12. The construction of claim 11 wherein the hoop or annular strands are preferably about 80% in number and the vertical about 20% in number.

13. The construction of claim 1 wherein said second layer comprises at least one of a continuous strand fiberglass mat and distributed random fiberglass filaments.

14. The construction of claim 13 wherein said second layer has a density of from 12 oz. per square yard to 48 oz. per square yard.

15. The construction of claim 1 wherein the fiberglass strands comprise continuous fiberglass rovings with a per bundle yield between 53 yards per pound and 625 yards per pound.

16. The construction of claim 15 wherein the strands are grouped, spread and controlled to yield between 30 oz. per square yard and 250 oz. per square yard of unidirectional reinforcement.

17. A composite pile construction comprising:

a pre-formed laminate of a plurality of fiberglass layers that are bound together with a resin, wherein the pre-formed laminate comprises first and second layers of a fiberglass material, a plurality of fiberglass strands extending in a spaced unidirectional matrix and disposed between said respective first and second layers, and a plurality of pervious tube members extending between respective first and second layers and uniformly arranged so as to enable injection of the resin therethrough; and a plastic outer skin fixed to one side of the laminate and constructed and arranged to form an outer surface of the tubular pile.

18. The composite pile construction of claim 17 wherein the plastic outer skin is made of polypropylene terephthalate.

19. The composite pile construction of claim 17 wherein said first layer comprises a woven roving fiberglass cloth, wherein said second layer comprises at least one of a continuous strand fiberglass mat and distributed random fiberglass filaments, wherein the pervious tube members comprise spiral slotted members from which the resin can escape therealong, and wherein strands from said first layer are driven through said second layer to bind together the layers of the pre-formed laminate.

* * * * *